US012620077B2

(12) United States Patent (10) Patent No.: US 12,620,077 B2
Son (45) Date of Patent: May 5, 2026

(54) SURFACE INSPECTION METHOD AND SURFACE INSPECTION DEVICE FOR DISPLAY PANEL

(71) Applicant: Seoul National University R&DB Foundation, Seoul (KR)

(72) Inventor: Byungkyu Son, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 345 days.

(21) Appl. No.: 18/222,663

(22) Filed: Jul. 17, 2023

(65) Prior Publication Data

US 2024/0135521 A1 Apr. 25, 2024
US 2024/0233106 A9 Jul. 11, 2024

(30) Foreign Application Priority Data

Oct. 25, 2022 (KR) ........................ 10-2022-0138422

(51) Int. Cl.
*G06T 7/00* (2017.01)
*G06T 7/579* (2017.01)
*H04N 23/695* (2023.01)
*H04N 25/71* (2023.01)

(52) U.S. Cl.
CPC ............ *G06T 7/0004* (2013.01); *G06T 7/579* (2017.01); *H04N 23/695* (2023.01); *H04N 25/71* (2023.01)

(58) Field of Classification Search
CPC .................. G06T 7/0004; G06T 7/579; G06T 2207/20081; G06T 2207/30121; G06T 7/521; H04N 23/695; H04N 25/71; H04N 23/60; H04N 23/90; H04N 17/004; G01N 21/956; G01N 2021/9513
See application file for complete search history.

(56) References Cited

U.S. PATENT DOCUMENTS

| 2012/0050487 | A1* | 3/2012 | Masumura | G01M 11/0221 |
| | | | | 348/46 |
| 2016/0131593 | A1* | 5/2016 | Kwon | G01B 9/02087 |
| | | | | 438/15 |
| 2018/0190170 | A1* | 7/2018 | Yang | G09G 3/006 |
| 2019/0137407 | A1* | 5/2019 | Seo | G01N 21/9501 |
| 2022/0390385 | A1* | 12/2022 | Aikawa | G06T 7/0002 |

FOREIGN PATENT DOCUMENTS

| JP | 2007256240 | A | * | 10/2007 | |
| JP | 2018021873 | A | * | 2/2018 | |
| JP | 2019120644 | A | * | 7/2019 | G01N 21/8851 |
| KR | 20000000875 | A | | 1/2000 | |
| KR | 20080033472 | A | | 4/2008 | |
| KR | 100910574 | B1 | | 8/2009 | |
| KR | 20140128698 | A | * | 11/2014 | G01B 11/24 |
| KR | 20160056466 | A | | 5/2016 | |
| KR | 20220072269 | A | | 6/2022 | |

OTHER PUBLICATIONS

Three-Dimensional Shape Measurements of Specular Objects Using Phase-Measuring Deflectometry. Zhang et al. (Year: 2017).*

* cited by examiner

*Primary Examiner* — Delomia L Gilliard

(74) *Attorney, Agent, or Firm* — CANTOR COLBURN LLP

(57) ABSTRACT

A surface inspection method includes applying a signal to a display panel so that the display panel displays a test pattern; capturing a surface of the display panel on which the test pattern is displayed with a camera; and processing a captured image data to obtain a surface distortion shape.

18 Claims, 7 Drawing Sheets

(a)

(b)

(c)

(d)

(a)          (b)          (c)

SURFACE INSPECTION METHOD AND SURFACE INSPECTION DEVICE FOR DISPLAY PANEL

This application claims priority to Korean Patent Application No. 10-2022-0138422 filed on Oct. 25, 2022, and all the benefits accruing therefrom under 35 U.S.C. § 119, the content of which in its entirety is herein incorporated by reference.

BACKGROUND

(a) Field

This disclosure relates to a surface inspection method and a surface inspection device for a display panel.

(b) Description of the Related Art

A display device such as a light-emitting display device and a liquid crystal display device includes a display panel providing a screen for displaying an image. The display panel may be formed by stacking several layers such as a conductive layer, a semiconductor layer, and an insulating layer on a substrate. Various inspections may be performed during and after manufacture of the display panel. An inspection may be performed on whether a surface of the display panel is defective in appearance, curvature, deformation, height, or the like, for example.

SUMMARY

For surface inspection of a display panel, three-dimensional data of a surface of the display panel may be obtained from an image obtained by projecting a pattern on the surface of the display panel and capturing a pattern reflected by the surface of the display panel with a camera. In order to perform the surface inspection, a projector for projecting the pattern on the surface of the display panel may be desired. In addition, there is a limit to a resolution of the pattern obtained through reflection by the surface of the display panel.

Embodiments are to provide a device and a method for inspecting a surface of a display panel precisely in a simple manner.

A surface inspection method in an embodiment includes applying a signal to a display panel so that the display panel displays a test pattern, capturing a surface of the display panel on which the test pattern is displayed with a camera, and processing a captured image data and obtaining a surface distortion shape.

In an embodiment, the test pattern may include a fringe pattern.

In an embodiment, the displaying the test pattern may include changing and displaying at least one of a position, a type, and a color of the fringe pattern.

In an embodiment, the capturing the surface of the display panel may include capturing while moving the camera within a range in which an optical axis of a lens of the camera defines an angle of about 15° to about 90° with respect to a plane of the display panel.

In an embodiment, the obtaining the surface distortion shape may include obtaining a three-dimensional ("3D") distortion shape by combining distortion shapes of test patterns for each angle captured while moving the camera.

In an embodiment, the camera may include an area sensor or a line sensor.

In an embodiment, the camera may include a time delay integration ("TDI") sensor.

In an embodiment, the surface of the display panel may include a surface of an encapsulation layer of the display panel or a surface of an organic layer included in the encapsulation layer.

In an embodiment, the display panel may include pixels, and the test pattern may be displayed by a combination of light emitted by the pixels.

In an embodiment, the surface inspection method may further include analyzing an obtained surface distortion shape and determining a defect.

A surface inspection device in an embodiment includes a stage on which a display panel is disposed, a signal applying device that applies a signal to the display panel so that the display panel displays a test pattern, and a camera that captures a surface of the display panel in a state where the display panel displays the test pattern.

In an embodiment, the test pattern may include a fringe pattern.

In an embodiment, the test pattern may be displayed by changing at least one of a position, a type, and a color of the fringe pattern.

In an embodiment, the camera may capture while the camera moves within a range in which an optical axis of a lens of the camera defines an angle of about 15° to about 90° with respect to a plane of the display panel.

In an embodiment, the camera may include an area sensor or a line sensor.

In an embodiment, the camera may include a TDI sensor.

In an embodiment, the surface of the display panel may include a surface of an encapsulation layer of the display panel or a surface of an organic layer included in the encapsulation layer.

In an embodiment, the display panel may include pixels, and the test pattern may be displayed by a combination of light emitted by the pixels.

By the embodiments, since the display panel itself displays a test pattern to perform surface inspection of the display panel, there is no need to project a fringe pattern on the surface of the display panel using a projector. In addition, since the display panel may display a fringe pattern with a shorter period than that of the projected fringe pattern, fine surface curvature may be detected. Therefore, in the embodiments, the surface of the display panel may be inspected simply and precisely. In addition, in the embodiments, there is an advantageous effect that is recognized throughout the specification.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
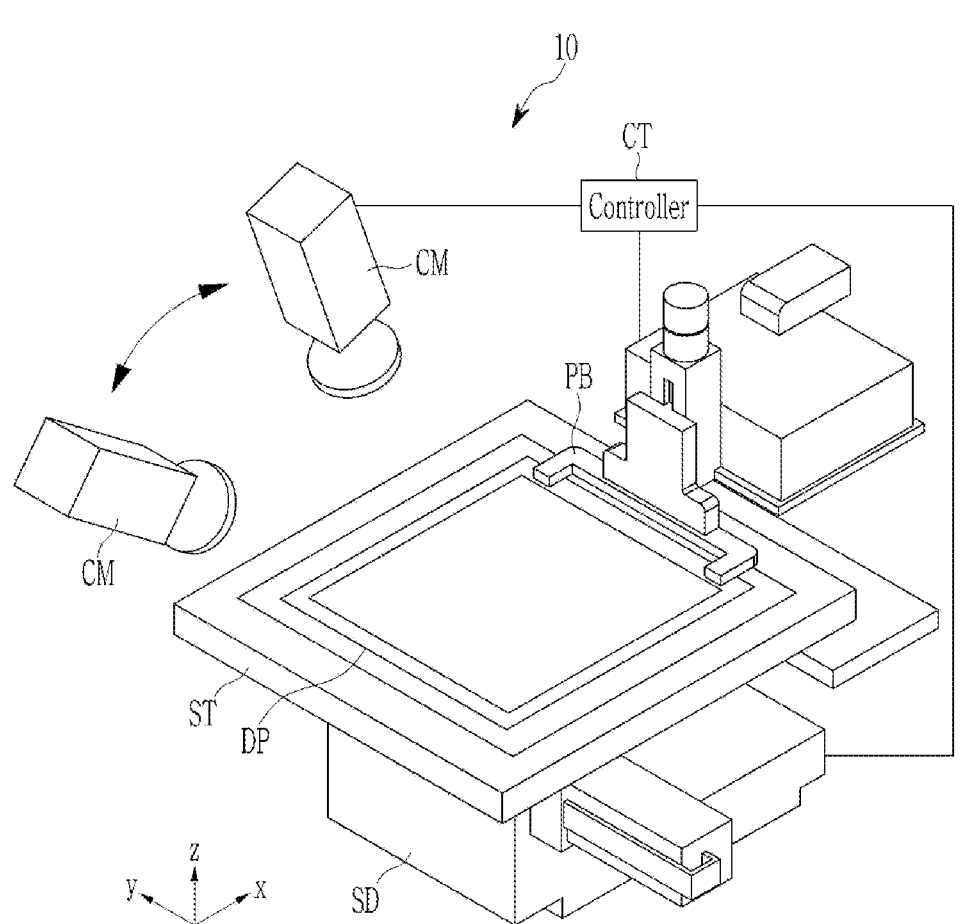
FIG. 1 is a view schematically illustrating an embodiment of an inspection device.

With reference to the accompanying drawing, the disclosure will be described in detail and therefore a person of ordinary skill may easily implement it in the technical field to which the disclosure is included.

When a part of a layer, film, region, plate, and the like is "on" or "above" another part, it includes not only the case where it is "directly on" another component, but also the case where there is another component in between. On the contrary, when a component is "right above" another, it means that there are no other components in between.

In addition, unless explicitly described to the contrary, the word "comprise" and variations such as "comprises" or "comprising" will be understood to imply the inclusion of stated elements but not the exclusion of any other elements.

Throughout the specification, "connected" does not mean only when two or more constituent elements are directly connected, but may also include a case that two or more constituent elements are indirectly connected through other constituent elements, a case that they are physically connected, a case of electrically connected, and a case in which each part that is substantially integral with each other while being referred to by a different name depending on a position or function.

In the drawings, the signs "x", "y", and "z" are used to indicate directions, where "x" is a first direction, "y" is a second direction that is perpendicular to the first direction, and "z" is a third direction that is perpendicular to the first direction and the second direction.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a view schematically illustrating an embodiment of an inspection device (or a surface inspection device).

Referring to FIG. 1, the inspection device 10 may be a device for inspecting a surface of a display panel DP. The inspection device 10 may include a stage ST, a signal applying device PB, a camera CM, a controller CT, or the like. The display panel DP, which is an object to be inspected, may be disposed above or on the stage ST. The display panel DP may include pixels, and may display an image using a combination of pixels. The display panel DP may include a pad portion capable of receiving a signal from the outside. A stage driver (or a stage driving unit) SD may be disposed below the stage ST, and the stage driver SD may drive the stage ST to move in a first direction x, a second direction y, and/or a third direction z.

The signal applying device (also referred to as a pin board) PB may be disposed adjacent to the stage ST, and may be connected to the display panel DP to apply a signal to the display panel DP. The signal applying device PB may include pins capable of applying signals by contacting pads disposed at the pad portion of the display panel DP. The display panel DP may receive a signal from the signal applying device PB to display a test pattern for inspection of the display panel DP. The test pattern may be a still image.

The camera CM may photograph the surface of the display panel DP. The camera CM may move to capture images of the surface of the display panel DP at various angles. In an embodiment, the camera CM may capture the surface of the display panel DP while the camera CM moves within a range where an optical axis of a lens of the camera CM defines an angle of about 15° to about 90° with respect to a plane (or a x-y plane) of the display panel DP, for example. The camera CM may be disposed (e.g., mounted) at a support (e.g., a gantry) capable of moving in the first direction x, the second direction y, and/or the third direction z.

The controller CT may control an overall operation of the inspection device 10. The controller CT may be connected to the camera CM, the signal applying device PB, and the stage driver SD in a wired and/or wireless manner, and may control an operation of each of the camera CM, the signal applying device PB, and the stage driver SD. The controller CT may process image data captured by the camera CM to obtain a distortion shape of the surface, and may determine a defect based on the surface distortion shape.

Figure 2:
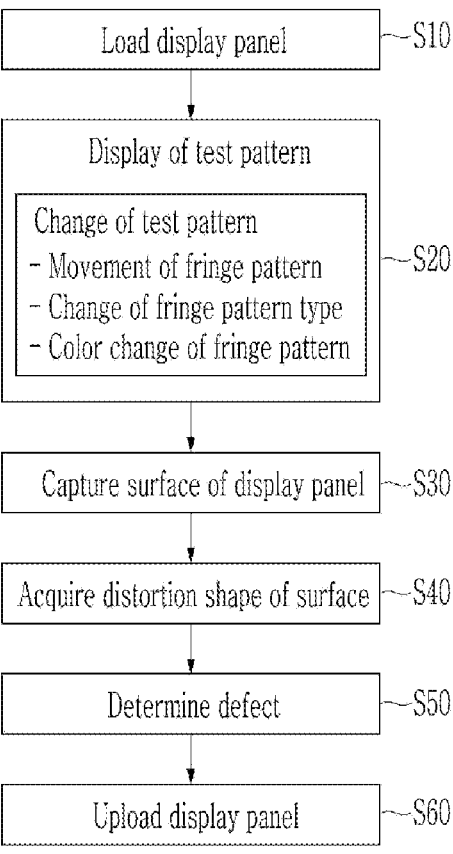
FIG. 2 is a flowchart illustrating an embodiment of a surface inspection method for a display panel.
Figure 3:
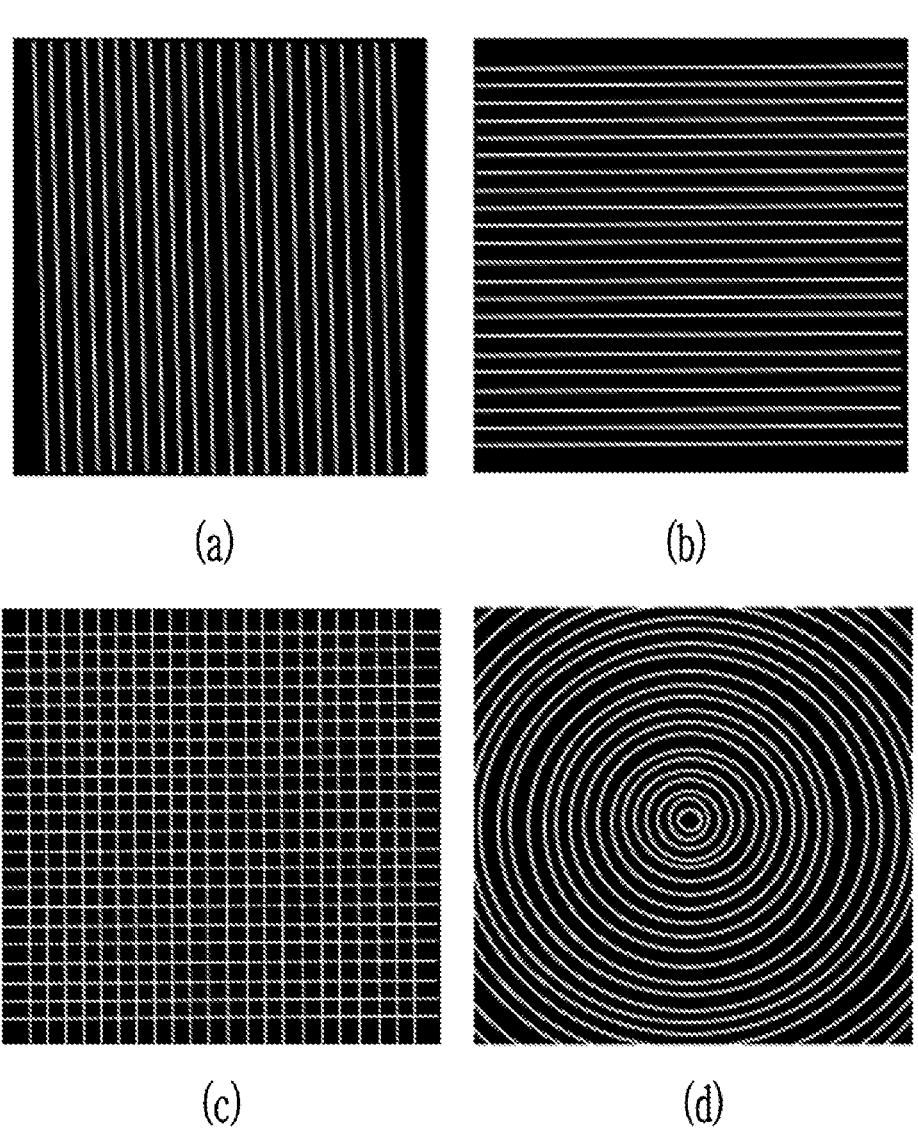
FIGS. 3 and 4 respectively illustrate a fringe pattern displayed at the display panel.
Figure 4:
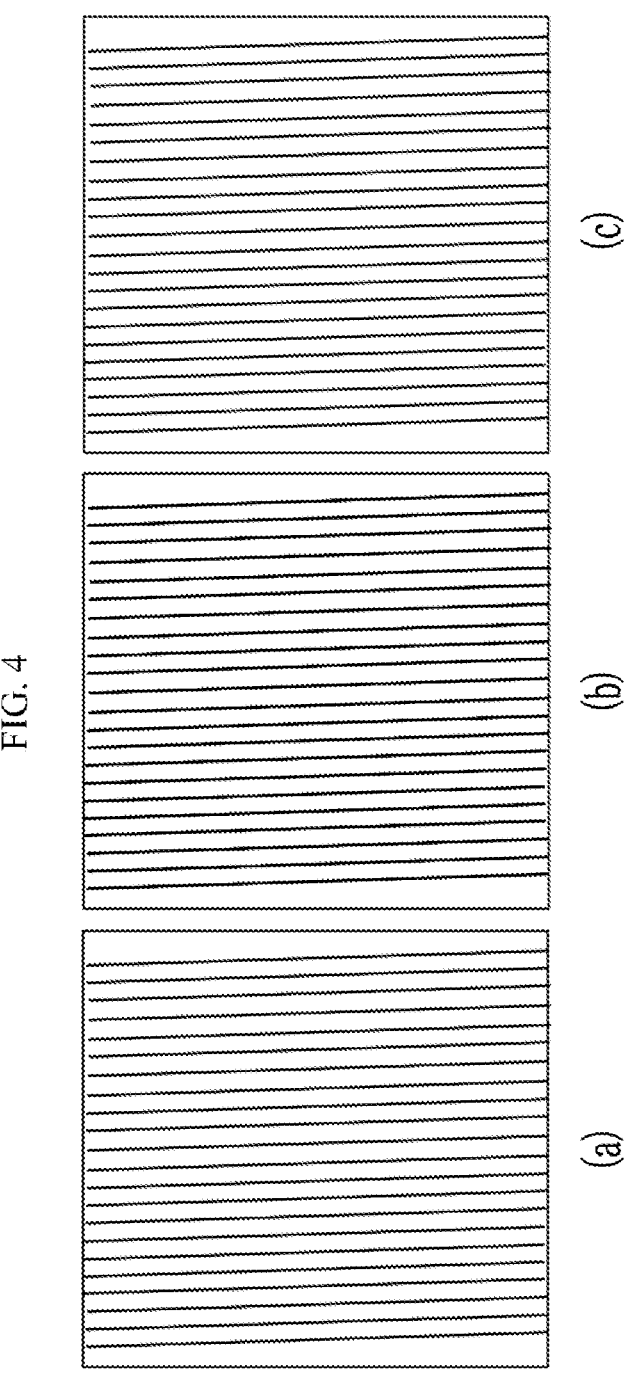
Figure 5:
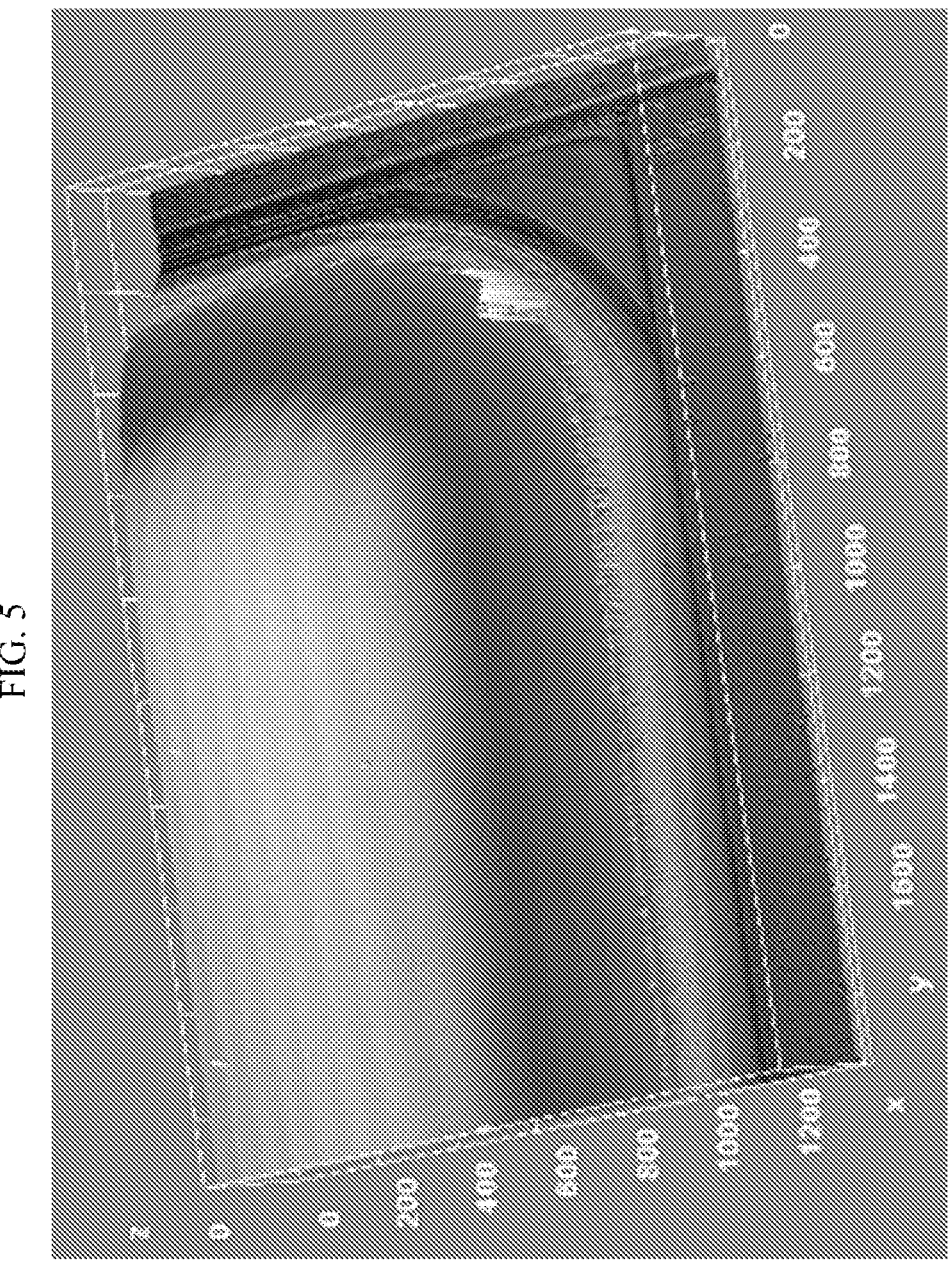
FIG. 5 illustrates 3D shape data obtained by capturing the fringe pattern displayed at the display panel.

FIG. 2 is a flowchart illustrating an embodiment of a surface inspection method for the display panel. FIGS. 3 and 4 respectively illustrate a fringe pattern displayed at the display panel. FIG. 5 illustrates three dimensional ("3D") shape data obtained by capturing the fringe pattern displayed at the display panel.

Surface inspection of the display panel DP may be performed using the inspection device 10 shown in FIG. 1. First, the display panel DP may be loaded above or on the stage ST (S10). The inspection device 10 may include a loading device (or a loading unit) for loading the display panel DP to be inspected.

Next, the test pattern for the surface inspection of the display panel DP may be displayed by applying a signal to the display panel DP (S20). The signal applying device PB may be connected to the display panel DP to apply a signal for displaying the test pattern to the display panel DP.

In an embodiment, the displayed test pattern may be a fringe pattern (also referred to as a Moiré pattern or an interference fringe) illustrated in FIG. 3, for example. The fringe pattern may have periodicity as a stripe that is the fringe pattern is generated by interference of a wave. The fringe pattern is displayed for surface analysis of the display panel DP, and is not projected at the surface of the display panel DP using a projector but the display panel DP itself may display the fringe pattern using the pixels. Even when the pixels display the fringe pattern of a predetermined wavelength by driving the display panel DP, the fringe pattern displayed at the surface of the display panel DP may be deformed according to a surface state of the display panel DP.

Next, the surface of the display panel DP on which the test pattern is displayed may be captured by the camera CM (S30). The camera CM may include an area sensor or a line sensor. A capturing angle of the camera is not fixed, and the surface of the display panel DP may be captured at various angles. In an embodiment, the surface of the display panel DP may be photographed while the camera CM moves within a range where the optical axis of the lens of the camera CM defines an angle of about 15° to about 90° with respect to the plane of the display panel DP, for example. Accordingly, images captured at various angles may be obtained, and a 3D shape may be formed by combining distortion shapes of test patterns for each angle.

When the surface of the display panel DP is captured, the capturing may be performed while the test pattern displayed at the display panel DP is changed. In an embodiment, the surface of the display panel DP may be captured while the fringe pattern is displayed, and the surface of the display panel DP may be captured while the same fringe pattern that is moved by a predetermined distance (e.g., less than a wavelength (λ) of the fringe pattern, λ/2, or λ/3) in a predetermined direction, is displayed, for example. In another embodiment, the surface of the display panel DP may be captured while a vertical or horizontal fringe pattern illustrated in FIG. 3(a) or 3(b) is displayed, and the surface of the display panel DP may be captured while a grid or concentric fringe pattern illustrated in FIG. 3(c) or 3(d) is displayed. In another embodiment, the surface of the display panel DP may be captured while a red fringe pattern shown in FIG. 4(a) is displayed, the surface of the display panel DP may be captured while a green fringe pattern shown in FIG. 4(b) is displayed, and the surface of the display panel DP may be captured while a blue fringe pattern shown in FIG. 4(c) is displayed. Due to a difference in refractive index according to a displayed color, different captured images may be obtained even when fringe patterns are the same. Thus, various images may be obtained by changing a position, a type, a color, or the like of the fringe pattern, detailed surface information may be obtained based on the obtained various images, and measurement consistency may be improved.

Next, the distortion shape of the surface of the display panel DP may be acquired (or obtained) from an image captured by the camera CM (S40). Acquisition of the distortion shape may be performed using a known method (e.g., a Fourier transform method) for analyzing a phase of a pattern. When the surface of the display panel DP is curved, distortion occurs at the fringe pattern displayed at a portion corresponding to the curved surface. Thus, surface shape data of the display panel DP may be obtained from whether the fringe pattern is distorted, a degree of the distortion, a shape of the distortion, or the like. In addition, as shown in FIG. 5, the 3D shape data of the surface of the display panel DP may be obtained by combining images captured at various angles. In addition, curvature measurement may be performed in detail using images captured while the position, the type, and/or the color of the fringe pattern are changed.

Next, the defect may be determined by analyzing the acquired surface distortion shape (S50). In an embodiment, it is possible to determine whether the surface of the display panel DP is defective, a type of the defect, a degree of the defect, or the like from the distortion shape, and the surface state of the display panel DP may be monitored, for example. Through analysis of the surface distortion shape, it is possible to detect a foreign substance on the surface of the display panel DP as well as curvature of the surface of the display panel DP itself. Determination of the defect may be performed through automatic defect classification ("ADC") based on image processing and machine learning techniques.

Next, the display panel DP for which the defect determination is completed may be unloaded (S60). The inspection device may include an unloading device (or an unloading unit) that unloads the inspected display panel DP from the stage ST.

Figure 6:
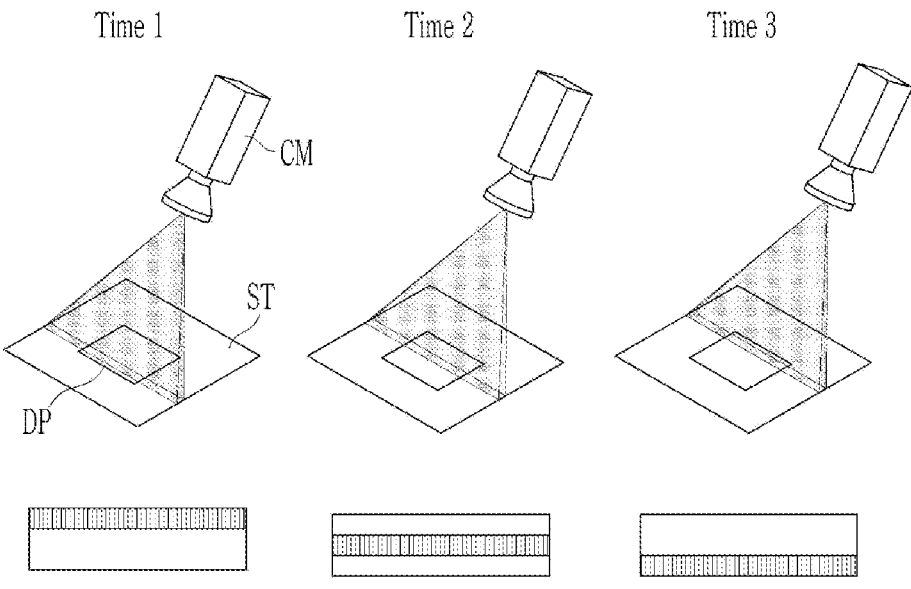
FIG. 6 is a view schematically illustrating an embodiment of the surface inspection method for the display panel.

FIG. 6 is a view schematically illustrating an embodiment of the surface inspection method for the display panel.

Referring to FIG. 6, in capturing of the surface of the display panel DP on which the test pattern is displayed, the camera CM including a time delay integration ("TDI") sensor may be used. A TDI method integrates a luminance value according to movement of a subject while the subject is moved, so that a relatively large amount of light is secured and noise is improved by smoothing by integration. Movement of the subject (that is, the display panel DP) may be performed by moving the stage ST on which the display panel DP is placed or by moving the camera CM. In an embodiment, an upper portion of the surface of the display panel DP may be captured in Time 1, a middle portion of the surface of the display panel DP may be captured in Time 2, and a lower portion of the surface of the display panel DP may be captured in Time 3, but the disclosure is not limited thereto.

Figure 7:
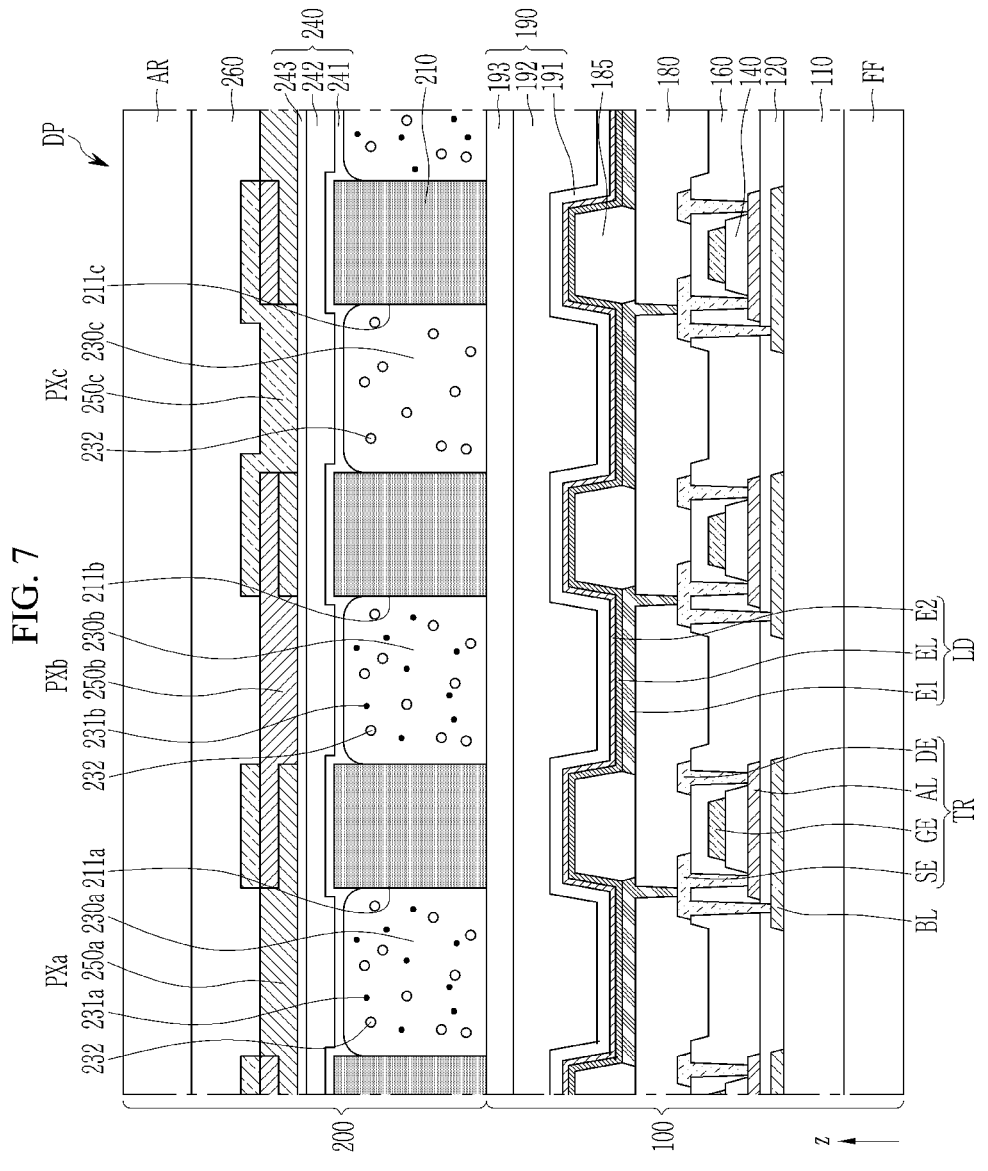
FIG. 7 is a schematic cross-sectional view of an embodiment of the display panel.

FIG. 7 is a schematic cross-sectional view of an embodiment of the display panel.

Referring to FIG. 7, a cross-section of a region at which three pixels PXa, PXb, and PXc are disposed in the display panel DP is illustrated. The pixels PXa, PXb, and PXc may include a first pixel PXa, a second pixel PXb, and a third pixel PXc representing different colors from each other. In an embodiment, the first pixel PXa may emit red light, the second pixel PXb may emit green light, and the third pixel PXc may emit blue light. The first pixel PXa, the second pixel PXb, and the third pixel PXc may be repeatedly disposed in the first direction x and in the second direction y at a region (or a display region) corresponding to a screen in the display panel DP, for example. The above-described test pattern may be displayed by a combination of light emitted by the pixels PXa, PXb, and PXc.

The display panel DP may include a display portion 100 and a color conversion portion 200. The color conversion portion 200 may be disposed on the display portion 100, and an entirety of the color conversion portion 200 may overlap the display portion 100.

The display portion 100 may include a light-emitting element LD corresponding to each of the pixels PXa, PXb, and PXc. The color conversion portion 200 may convert a wavelength of light emitted from the light-emitting element LD to emit the converted wavelength to the outside of the display panel DP.

The display portion 100 may basically include a substrate 110, a transistor TR formed above the substrate 110, and the light-emitting element LD connected to the transistor TR.

The substrate 110 may include a material (e.g., glass) having a rigid property or a material (e.g., plastic) having a flexible property. In an embodiment, the substrate 110 may be a glass substrate, for example.

A light-blocking layer BL may be disposed on the substrate 110. The light-blocking layer BL may prevent external light from reaching a semiconductor layer AL of the transistor TR to prevent characteristic degradation of the semiconductor layer AL. A leakage current of the transistor TR (particularly, a driving transistor in which a current characteristic is important) may be controlled by the light-blocking layer BL. The light-blocking layer BL may include a material through which light in a wavelength band to be blocked may not be transmitted. In an embodiment, the light-blocking layer BL may include a metal such as copper (Cu), aluminum (Al), molybdenum (MO), titanium (Ti), tungsten (W), or the like, and may be a single layer or multiple layers, for example. The light-blocking layer BL may function as an electrode to which a predetermined voltage is applied in the display panel DP. In this case, a current change rate in a saturated region of a voltage-current characteristic graph of the transistor TR may be reduced so that a characteristic of the driving transistor is improved.

A buffer layer 120 may be disposed on the substrate 110 and the light-blocking layer BL. The buffer layer 120 may improve a characteristic of the semiconductor layer AL by blocking an impurity from the substrate 110 when the semiconductor layer AL is formed, and may alleviate a stress of the semiconductor layer AL by flattening a surface of the substrate 110. The buffer layer 120 may include an inorganic insulating material such as a silicon nitride ($SiN_x$), a silicon oxide ($SiO_x$), a silicon nitride oxide ($SiO_xN_y$), or the like.

The semiconductor layer AL may be disposed on the buffer layer 120. The semiconductor layer AL may include a first region, a second region, and a channel region between the first region and the second region. The semiconductor layer AL may include an oxide semiconductor. In an embodiment, the semiconductor layer AL may include an oxide semiconductor (e.g., an indium-gallium-zinc oxide ("IGZO")) including at least one of zinc (Zn), indium (In), gallium (Ga), tin (Sn), and any combinations thereof, for example. The semiconductor layer AL may also include polycrystalline silicon or amorphous silicon, and for example, may include low-temperature polysilicon ("LTPS").

A gate insulating layer 140 may be disposed on the semiconductor layer AL. The gate insulating layer 140 may be formed at a region overlapping a gate electrode GE. This structure may be formed by etching the gate insulating layer 140 during a photolithography process for forming the gate electrode GE. The gate insulating layer 140 may also substantially cover an entirety of the substrate 110. The gate insulating layer 140 may include an inorganic insulating material such as a silicon oxide, a silicon nitride, a silicon oxynitride, or the like, and may be a single layer or multiple layers.

The gate electrode GE may be disposed on the gate insulating layer 140. The gate electrode GE may overlap the channel region of the semiconductor layer AL. The gate electrode GE may include a metal such as molybdenum (Mo), aluminum (Al), copper (Cu), titanium (Ti), or the like, and may be a single layer or multiple layers. In the specification, forming the same layer may mean that components include or consist of the same material in the same process (e.g., the same photolithography process).

An inter-insulating layer 160 may be disposed on the gate electrode GE. The inter-insulating layer 160 may include an inorganic insulating material such as a silicon oxide, a silicon nitride, a silicon oxynitride, or the like, and may be a single layer or multiple layers.

A first electrode SE and a second electrode DE of the transistor TR may be disposed on the inter-insulating layer 160. One of the first electrode SE and the second electrode DE may be a source electrode of the transistor TR, and the other of the first electrode SE and the second electrode DE may be a drain electrode of the transistor TR. The first electrode SE and the second electrode DE may be respectively connected to the first and second regions of the semiconductor layer AL through contact holes defined in the inter-insulating layer 160. The first electrode SE or the second electrode DE may be connected to the light-blocking layer BL through a contact hole defined in the inter-insulating layer 160, the gate insulating layer 140, and the buffer layer 120. Each of the first electrode SE and the second electrode DE may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), or the like, and may be a single layer or multiple layers.

The semiconductor layer AL, the gate electrode GE, the first electrode SE, and the second electrode DE may constitute the transistor TR.

A planarization layer 180 may be disposed on the first electrode SE and the second electrode DE. The planarization layer 180 may include an organic insulating material such as a general-purpose polymer (e.g., poly(methyl methacrylate) or polystyrene), a polymer derivative with a phenol-based group, an acryl-based polymer, an imide-based polymer (e.g., polyimide), a siloxane-based polymer, or the like.

A pixel electrode E1 of the light-emitting element LD may be disposed on the planarization layer 180. The pixel electrode E1 may be connected to the second electrode DE through a contact hole defined in the planarization layer 180. The pixel electrode E1 may include or consist of a reflective conductive material or a semi-transmissive conductive material, or may include or consist of a transparent conductive material. The pixel electrode E1 may include a transparent conductive material such as indium tin oxide ("ITO") or indium zinc oxide ("IZO"). The pixel electrode E1 may include a metal such as lithium (Li), calcium (Ca), aluminum (Al), silver (Ag), magnesium (Mg), or gold (Au). The pixel electrode E1 may have a multilayer structure, and for example, may have a triple layer structure such as ITO-silver (Ag)-ITO.

A pixel defining layer 185 in which an opening overlapping the pixel electrode E1 is defined may be disposed on the planarization layer 180. The pixel defining layer 185 may include an organic insulating material such as an acryl-based polymer, an imide-based polymer, or an amide-based polymer. The pixel defining layer 185 may include a color pigment such as a black pigment, a blue pigment, or the like. In an embodiment, the pixel defining layer 185 may include a polyimide binder and a pigment in which red, green, and blue are mixed, for example. The pixel defining layer 185 may include a cardo binder resin and a combination of a lactam black pigment and a blue pigment. The pixel defining layer 185 may include carbon black. The pixel defining layer 185 including a black pigment may improve a contrast ratio, and may prevent reflection by a metal layer disposed below the pixel definition layer.

A light-emitting layer EL may be disposed on the pixel electrode E1 and the pixel defining layer 185. The light-emitting layer EL may contact the pixel electrode E1 through the opening of the pixel defining layer 185. Unlike the drawings, the light-emitting layer EL may be disposed within the opening of the pixel defining layer 185. The light-emitting layer EL may include a light-emitting material that emits blue light. The light-emitting layer EL may include a light-emitting material that emits red light or green light in addition to blue light. In addition to the light-emitting layer EL, at least one of a hole injection layer, a hole transport layer, an electron transport layer, and an electron injection layer may be disposed on the pixel electrode E1.

A common electrode E2 may be disposed on the light-emitting layer EL. The common electrode E2 may be disposed across the pixels PXa, PXb, and PXc. The common electrode E2 may include a metal such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), lithium (Li), or the like. The common electrode E2 may include a transparent conductive oxide such as indium tin oxide ("ITO") and indium zinc oxide ("IZO").

The pixel electrode E1, the light-emitting layer EL, and the common electrode E2 may constitute the light-emitting element LD that may be an organic light-emitting diode or an inorganic light-emitting diode. The pixel electrode E1 may be individually provided for each pixel PXa, PXb, and PXc to receive a driving current. The common electrode E2 may be provided in common to the pixels PXa, PXb, and PXc to receive a common voltage. The pixel electrode E1 may be an anode that is a hole injection electrode, and the common electrode E2 may be a cathode that is an electron injection electrode, or vice versa. The opening of the pixel defining layer 185 may correspond to a light-emitting region of the light-emitting element LD.

A display portion encapsulation layer (hereinafter also simply referred to as a first encapsulation layer) 190 may be disposed on the common electrode E2. The first encapsulation layer 190 may seal the light-emitting elements LD, and may prevent moisture or oxygen from penetrating from the outside. The first encapsulation layer 190 may cover an entirety of the display region, and an edge of the first encapsulation layer 190 may be disposed at a non-display region. The first encapsulation layer 190 may be a thin film encapsulation layer including a first inorganic layer 191, a second inorganic layer 193, and an organic layer 192. The first inorganic layer 191 and the second inorganic layer 193 may mainly prevent penetration of moisture or the like, and the organic layer 192 may mainly planarize a surface of the first encapsulation layer 190 (particularly, a surface of the second inorganic layer 193 in the display region). The first inorganic layer 191 or the second inorganic layer 193 may include an inorganic insulating material such as a silicon oxide, a silicon nitride, or the like. The organic layer 192 may include an organic material such as an acryl-based resin, a methacrylic-based resin, a polyisoprene, a vinyl-based resin, an epoxy-based resin, a urethane-based resin, a cellulose-based resin, a perylene-based resin, or the like. The above-described surface inspection method may be performed to inspect a surface state (flatness, a foreign substance, or the like) of the organic layer 192 after the organic layer 192 is formed or to inspect a surface state of the first encapsulation layer 190 after the second inorganic layer 193 is formed.

The color conversion portion 200 may include a bank 210, a reflective layer (not shown), first and second color conversion layers 230a and 230b, a transmission layer 230c, a color conversion portion encapsulation layer 240, color filters 250a, 250b, and 250c, and an overcoat layer 260.

The bank 210 may be disposed on the display portion 100. In an embodiment, a lower surface of the bank 210 may contact an upper surface of the first encapsulation layer 190, for example. The bank 210 may overlap the pixel defining layer 185. The bank 210 may not overlap or may hardly overlap the light-emitting element LD. The bank 210 may be disposed at a boundary portion between the pixels PXa, PXb, and PXc. The bank 210 may partition a pixel region. The bank 210 may limit openings 211a, 211b, and 211c overlapping the light-emitting element LD. The openings 211a, 211b, and 211c may penetrate the bank 210 in the third direction z. The openings 211a, 211b, and 211c may include a first opening 211a overlapping the light-emitting element LD corresponding to the first pixel PXa, a second opening 211b overlapping the light-emitting element LD corresponding to the second pixel PXb, and a third opening 211c overlapping the light-emitting element LD corresponding to the third pixel PXc. The bank 210 may include an organic material such as an acryl-based polymer, an epoxy-based polymer, an imide-based polymer, an olefin-based polymer, or an amide-based polymer. The bank 210 may include a color pigment such as a black pigment or a blue pigment. The bank 210 may be transparent.

The first color conversion layer 230a, the second color conversion layer 230b, and the transmission layer 230c may be respectively disposed within the first opening 211a, the second opening 211b, and the third opening 211c. The first color conversion layer 230a may overlap the light-emitting element LD corresponding to the first pixel PXa, and may convert light incident from the light-emitting element LD to light having a first wavelength. The light of the first wavelength may have a maximum light-emitting peak wavelength of about 600 nanometers (nm) to about 650 nm, and for example, may be red light having a wavelength of about 620 nm to about 650 nm. The second color conversion layer 230b may overlap the light-emitting element LD corresponding to the second pixel PXb, and may convert light incident from the light-emitting element LD to light having a second wavelength. The light of the second wavelength may have a maximum light-emitting peak wavelength of about 500 nm to about 550 nm, and for example, may be green light having a wavelength of about 510 nm to about 550 nm. The transmission layer 230c may overlap the light-emitting element LD corresponding to the third pixel PXc, and may transmit light incident from the light-emitting element LD. Light transmitted through the transmission layer 230c may be light having a third wavelength. The light of the third wavelength may have a maximum light-emitting peak wavelength of about 380 nm to about 480 nm, and for example, may be blue light having a wavelength of about 420 nm or more, about 430 nm or more, about 440 nm or more, or about 440 nm or more, and about 470 nm or less, about 460 nm or less, or about 455 nm or less.

The first color conversion layer 230a and the second color conversion layer 230b may respectively include first quantum dots 231a and second quantum dots 231b. In an embodiment, light incident at the first color conversion layer 230a may be converted to the light of the first wavelength by the first quantum dots 231a so that the converted light is emitted, for example. Light incident at the second color conversion layer 230b may be converted to the light of the second wavelength by the second quantum dots 231b so that the converted light is emitted. The first color conversion layer 230a, the second color conversion layer 230b, and the transmission layer 230c may include scatterers 232. The scatterers 232 may improve light efficiency by scattering light incident at the first color conversion layer 230a, the second color conversion layer 230b, and the transmission layer 230c.

The scatterer 232 may be a metal oxide particle and/or an organic particle. In an embodiment, a metal oxide of the metal oxide particle may include $TiO_2$, $ZrO_2$, $Al_2O_3$, $In_2O_3$, $ZnO$, $SnO_2$, or the like, for example. In an embodiment, a material of the organic particle may include an acryl-based resin, a urethane-based resin, or the like, for example. The scatterer 232 may scatter light in a random direction regardless of an incident direction of incident light.

A color conversion portion encapsulation layer 240 (hereinafter also simply referred to as a second encapsulation layer) may be disposed on the bank 210, the reflective layer, the first and second color conversion layers 230a and 230b, and the transmission layer 230c. The second encapsulation layer 240 may seal the reflective layer, the first and second color conversion layers 230a and 230b, and the transmission layer 230c. The second encapsulation layer 240 may be a thin film encapsulation layer including a first inorganic layer 241, an organic layer 242, and a second inorganic layer 243. The first inorganic layer 241 and the second inorganic layer 243 may mainly prevent penetration of moisture or the like, and the organic layer 242 may mainly planarize a surface of the second encapsulation layer 240 (particularly, a surface of the second inorganic layer 243). The first inorganic layer 241 and the second inorganic layer 243 may include an inorganic insulating material such as a silicon oxide, a silicon nitride, or the like. The organic layer 242 may include an organic material such as an acryl-based resin, a methacrylic-based resin, a polyisoprene, a vinyl-based resin, an epoxy-based resin, a urethane-based resin, a cellulose-based resin, a perylene-based resin, or the like. The above-described surface inspection method may be performed to inspect a surface state of the organic layer 242 after the organic layer 242 is formed or to inspect a surface state of the second encapsulation layer 240 after the second inorganic layer 243 is formed.

At least one of the first inorganic layer 241, the organic layer 242, and the second inorganic layer 243 may be a relatively low refractive index layer. In an embodiment, the organic layer 242 may be a relatively low refractive index layer, and the organic layer 242 may include an organic material having a relatively low refractive index, for example. A refractive index of the relatively low refractive index layer may be about 1.1 to about 1.3.

The color filters 250a, 250b, and 250c may be disposed on the second encapsulation layer 240. The color filters 250a, 250b, and 250c may overlap openings of the pixel defining layer 185. The color filters 250a, 250b, and 250c may include a first color filter 250a that transmits the light of the first wavelength and absorbs light of a wavelength other than the first wavelength, a second color filter 250b that transmits the light of the second wavelength and absorbs light of a wavelength other than the second wavelength, and a third color filter 250c that transmits the light of the third wavelength and absorbs light of a wavelength other than the third wavelength.

The first color filter 250a, the second color filter 250b, and the third color filter 250c may respectively overlap the first color conversion layer 230a, the second color conversion layer 230b, and the transmission layer 230c. The first color filter 250a, the second color filter 250b, and the third color filter 250c may respectively correspond to the first pixel PXa, the second pixel PXb, and the third pixel PXc. Accordingly, purities of the light of the first wavelength (corresponding to the first pixel PXa), the light of the second wavelength (corresponding to the second pixel PXb), and the light of the third wavelength (corresponding to the third pixel PXc) emitted to the outside of the display panel DP may be increased. The light of the first wavelength, the light of the second wavelength, and the light of the third wavelength may be red light, green light, and blue light, respectively.

The first color filter 250a, the second color filter 250b, and the third color filter 250c may overlap each other at the boundary portion between the pixels PXa, PXb, and PXc to form a light-blocking region. As shown in the drawings, the first color filter 250a, the second color filter 250b, and the third color filter 250c may all overlap to form the light-blocking region, but two color filters may overlap to form the light-blocking region. In an embodiment, the first color filter 250a and the second color filter 250b may overlap at the boundary portion between the first pixel PXa and the second pixel PXb, the second color filter 250b and the third color filter 250c may overlap at the boundary portion between the second pixel PXb and the third pixel PXc, and the third color filter 250c and the first color filter 250a may overlap at the boundary portion between the third pixel PXc and the first pixel PXa, for example. The first color filter 250a, the second color filter 250b, and the third color filter 250c are sequentially stacked on the second encapsulation layer 240, but may be stacked in a different order. Instead of overlapping the color filters 250a, 250b, and 250c, a light-blocking member including a black pigment or dye may provide a light-blocking region.

The overcoat layer 260 may be disposed on the color filters 250a, 250b, and 250c. The overcoat layer may include an inorganic insulating material and/or an organic insulating material, and may be a single layer or multiple layers. The above-described surface inspection method may be performed to inspect a surface state (flatness, a foreign substance, or the like) of the overcoat layer 260 after the overcoat layer 260 is formed.

The display panel DP may further include an anti-reflection film AR disposed on the color conversion portion 200 and/or a functional film FF disposed below the display portion 100. The anti-reflection film AR may be attached to the color conversion portion 200. The anti-reflection film AR may include a polarization layer and a phase delay layer. The functional film FF may be attached to the display portion 100. Like a cushion layer, a shield layer, a heat radiation layer, or the like, the functional film FF may protect the display panel DP from a rear environment, and may include a structure capable of emitting heat generated by the display panel DP.

In the display panel DP with the above-described structure, the color conversion portion 200 may be formed on a separate substrate so that the color conversion portion 200 is not bonded to the display portion 100. Thus, thickness and weight of the display panel DP may be reduced and manufacturing cost may be reduced. In addition, since a distance between the light-emitting element LD that is a light source, and the first and second color conversion layers 230a and 230b and the transmission layer 230c, is close to a thickness of the first encapsulation layer 190, light loss may be reduced so that light efficiency is increased. Unlike the drawings, the color conversion portion 200 may be formed on a separate substrate to be bonded to the display portion 100.

While this disclosure has been described in connection with what is presently considered to be practical embodiments, it is to be understood that the inventive concept is not limited to the disclosed embodiments, but, on the contrary, is intended to cover various modifications and equivalent arrangements included within the spirit and scope of the appended claims.

What is claimed is:

1. A surface inspection method for inspecting a display panel, the method comprising:
   applying a signal to the display panel including pixels so that pixels of the display panel self-displays a test pattern;
   capturing a surface of the display panel on which the test pattern is displayed with a camera;
   processing a captured image data and obtaining a surface distortion shape of the surface of the display panel, and determining whether the surface of the display panel is defective based on the surface distortion shape.

2. The surface inspection method of claim 1, wherein the test pattern includes a fringe pattern.

3. The surface inspection method of claim 2, wherein the displaying the test pattern includes changing and displaying at least one of a position, a type, and a color of the fringe pattern.

4. The surface inspection method of claim 1, wherein the capturing the surface of the display panel includes capturing while moving the camera within a range in which an optical axis of a lens of the camera defines an angle of about 15° to about 90° with respect to a plane of the display panel.

5. The surface inspection method of claim 4, wherein the obtaining the surface distortion shape includes obtaining a three-dimensional distortion shape by combining distortion shapes of test patterns for each angle captured while moving the camera.

6. The surface inspection method of claim 1, wherein the camera includes an area sensor or a line sensor.

7. The surface inspection method of claim 1, wherein the camera includes a time delay integration sensor.

8. The surface inspection method of claim 1, wherein the surface of the display panel includes a surface of an encapsulation layer of the display panel or a surface of an organic layer included in the encapsulation layer.

9. The surface inspection method of claim 1, wherein the test pattern is displayed by a combination of light emitted by the pixels.

10. The surface inspection method of claim 1, further comprising analyzing an obtained surface distortion shape and determining a defect.

11. A surface inspection device for inspecting a display panel, the surface inspection device comprising:

a stage on which the display panel including pixels is disposed;

a signal applying device which applies a signal to the display panel so that the pixels of the display panel self-displays a test pattern;

a camera which captures a surface of the display panel in a state where the display panel displays the test pattern; and a controller which processes a captured image data and obtaining a surface distortion shape of the surface of the display panel, and determines whether the surface of the display panel is defective based on the surface distortion shape.

12. The surface inspection device of claim 11, wherein the test pattern includes a fringe pattern.

13. The surface inspection device of claim 12, wherein the test pattern is displayed by changing at least one of a position, a type, and a color of the fringe pattern.

14. The surface inspection device of claim 11, wherein the camera captures while the camera moves within a range in which an optical axis of a lens of the camera defines an angle of about 15° to about 90° with respect to a plane of the display panel.

15. The surface inspection device of claim 11, wherein the camera includes an area sensor or a line sensor.

16. The surface inspection device of claim 11, wherein the camera includes a time delay integration sensor.

17. The surface inspection device of claim 11, wherein the surface of the display panel includes a surface of an encapsulation layer of the display panel or a surface of an organic layer included in the encapsulation layer.

18. The surface inspection device of claim 11, wherein the test pattern is displayed by a combination of light emitted by the pixels.

* * * * *